UNITED STATES PATENT OFFICE.

AUGUST LEOPOLD LASKA, OF OFFENBACH-ON-THE-MAIN, GERMANY, ASSIGNOR TO THE CORPORATION OF CHEMISCHE FABRIK GRIESHEIM ELEKTRON, OF FRANKFORT-ON-THE-MAIN, GERMANY.

YELLOW DISAZO DYESTUFF FOR WOOL.

971,761.  Specification of Letters Patent.  Patented Oct. 4, 1910.

No Drawing.  Application filed May 5, 1910. Serial No. 559,540.

*To all whom it may concern:*

Be it known that I, AUGUST LEOPOLD LASKA, doctor of philosophy, chemist, subject of the German Emperor, and resident of Offenbach-on-the-Main, in the Grand Duchy of Hesse, Germany, with the post-office address Gerberstrasse No. 5, have invented new and useful Improvements in Yellow Disazo Dyestuffs for Wool, of which the following is a specification.

My invention relates to the production of yellow disazo dyestuffs for dyeing wool and consists in combining tetrazotized diamins corresponding to the general formula:

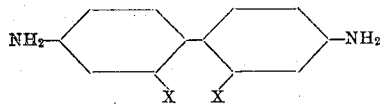

wherein X means $CH_3$ or Cl, with two molecules 1-sulfoaryl-3-methyl-5-pyrazolone. The thus obtained dyestuffs dye wool from acid bath yellow shades fast without after-treatment with chromates to white wool and cotton in the milling process. Diamins of the aforesaid constitution are meta-tolidin and meta-meta'-dichlorobenzidin.

The following examples will serve to illustrate the nature of my invention and how it can be carried out; parts being by weight.

Example I: 10.6 parts of meta-tolidin are tetrazotized and combined with an ice cold solution of 25.5 parts of 1-para-sulfophenyl-3-methyl-5-pyrazolone. The solution is kept alkaline by addition of soda till the formation of dyestuff is complete. The temperature of the mixture is then raised to 70° and the dyestuff precipitated by addition of common salt. The dyestuff forms a yellow brown powder, dissolving in concentrated sulfuric acid with reddish-yellow, in water with yellow color; the aqueous solution is scarcely altered by addition of caustic soda lye; by addition of hydrochloric acid the dyestuff is precipitated in form of yellow flakes. It dyes wool yellow shades fast against milling.

Example II: 12.65 parts of meta-dichlorobenzidin are tetrazotized and combined with an ice cold solution of 25.5 parts of 1-para-sulfophenyl-3-methyl-5-pyrazolone. The solution is kept alkaline by addition of soda till the formation of dyestuff is complete. The temperature of the mixture is raised to 70° and the dyestuff precipitated by addition of common salt. The dyestuff forms a yellow-brown powder and dissolves in concentrated sulfuric acid with reddish-yellow, in water with yellow color. This solution is scarcely altered by addition of caustic soda lye; by addition of hydrochloric acid the dyestuff is precipitated in form of yellow flakes. It dyes wool yellow shades fast against milling.

In analogous manner the formation of dyestuff may be performed by using other sulfoarylmethylpyrazolones, isomerics, homologues, or chlorin substitution products of 1-para-sulfophenyl-3-methyl-5-pyrazolone, for instance 1-meta-sulfophenyl-3-methyl-5-pyrazolone, 1-para-sulfo-orthotolyl-3-methyl-5-pyrazolone, 1-ortho-chloro-para-sulfophenyl-3-methyl-5-pyrazolone, 1-ortho-chloro-meta-sulfophenyl-3-methyl-5-pyrazolone, 1-para-chloro-meta-sulfophenyl-3-methyl-5-pyrazolone, 1-4-sulfo-2:5-dichlorophenyl-3-methyl-5-pyrazolone.

All these dyestuffs show the same substantial properties, *i. e.* they dye wool yellow shades varying from greenish-yellow to reddish-yellow according to the constitution of the aryl radical, and are fast to white wool and cotton in the milling process. They may also be used with advantage for production of pigment colors.

Now what I claim and desire to secure by Letters Patent is the following:

1. The process for the manufacture of yellow disazo dyestuffs for wool consisting in combining the tetrazo compounds of diamins of the general formula:

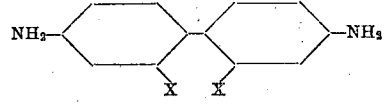

wherein X means $CH_3$, or Cl, with two molecules of 1-sulfophenyl-3-methyl-5-pyrazolone.

2. As new articles the disazo dyestuffs obtained by combining tetrazotized diamins of the general formula:

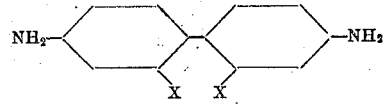

wherein X may be $CH_3$, or Cl, with two molecules of 1-sulfoaryl-3-methyl-5-pyrazolone, said dyestuffs being yellow-brown powders, dissolving in concentrated sulfuric acid with reddish-yellow, in water with yellow color, the aqueous solution being scarcely altered by addition of caustic soda lye, the dyestuff being precipitated in form of yellow flakes by addition of hydrochloric acid, the said dyestuffs dyeing wool yellow shades fast against milling.

3. The process for the manufacture of yellow disazo dyestuffs for wool consisting in combining the tetrazo compound of meta-meta'-dichlorobenzidin with two molecular proportions of 1 - sulfoaryl - 3 - methyl-5-pyrazolone.

4. As new articles the dyestuffs obtained by combining the tetrazo compound of meta-meta'-dichlorobenzidin with two molecular proportions of 1 - sulfoaryl - 3 - methyl-5-pyrazolone, being yellow-brown powders, dissolving in concentrated sulfuric acid with reddish-yellow, in water with yellow color, which solution is scarcely altered by addition of caustic soda dye, the dyestuff being precipitated by addition of hydrochloric acid; the said dyestuffs dyeing wool yellow shades fast against milling.

In testimony, that I claim the foregoing as my invention, I have signed my name in presence of two witnesses, this 22nd day of April 1910.

AUGUST LEOPOLD LASKA.

Witnesses:
 Eva Sattler,
 Oskar Standhardt.